United States Patent [19]
Gribble

[11] 3,738,764
[45] June 12, 1973

[54] MEANS FOR PRODUCING RELATIVE MOVEMENT BETWEEN TWO BODIES

[75] Inventor: Maurice Woolmer Gribble, Marple, England

[73] Assignee: Ferranti Limited, Hollinwood, Lancashire, England

[22] Filed: May 11, 1971

[21] Appl. No.: 142,278

Related U.S. Application Data
[62] Division of Ser. No. 789,459, Jan. 7, 1969, Pat. No. 3,596,526.

[52] U.S. Cl. .................... 408/3, 408/13, 408/234, 90/16, 90/13 C, 33/1 M
[51] Int. Cl. .................... B23b 39/08, B23c 1/12
[58] Field of Search ................ 90/16, 13 C, 11 R, 90/56 R; 408/88, 91, 69, 70, 49, 3, 13, 234; 33/1 M, 81

[56] References Cited
UNITED STATES PATENTS

| | | | |
|---|---|---|---|
| 3,241,243 | 3/1966 | Speer | 33/1 M X |
| 3,180,183 | 4/1965 | Stanley et al. | 408/88 X |
| 3,040,603 | 6/1962 | Benton | 408/70 X |

Primary Examiner—Gil Weidenfeld
Attorney—Cameron, Kerkam, Sutton, Stowell & Stowell

[57] ABSTRACT

Means for movig one body relative to another comprises a main toothed rack carried on one body and at least three actuators carried on the other body. Each actuator carries a stub rack of similar form to the main rack and is operable to force the stub rack into engagement with the main rack. The spacing between the actuators is such that sequential operation of the actuators causes the bodies to move relative to one another in the required direction.

8 Claims, 6 Drawing Figures

MEANS FOR PRODUCING RELATIVE MOVEMENT BETWEEN TWO BODIES

This application is a division off U. S. Ser. No. 789,459, filed Jan. 7,1969, by Maurice Woolmer Gribble, now U.S. Pat. No. 3,596,526.

This invention relates to means for producing relative movement between two bodies.

More specifically it relates to means for accurately positioning a machining head in any of a series of positions with respect to a workpiece, said positions being defined by the intersections of the rows and columns of a rectangular grid.

According to the present invention there is provided means for producing relative movement between two bodies comprising a main toothed rack attached to one of the two bodies and at least three actuators attached to the other body, each actuator being operable to force into engagement with the main toothed rack a stub toothed rack of the same tooth pitch as the main rack, the stub racks being spaced from one another along the main rack by a distance differing from an integral number of rack tooth pitches by a like fraction of a pitch equal to the reciprocal of the number of actuators.

Also according to the invention there is provided means for accurately positioning an operational head in any of a series of positions with respect to a member, the positions being defined by the intersections of the rows and columns of a rectangular grid, including a. A fixed bed on which is located the member and which carries a carriage movable in a straight line relative to the member, b. A slide carrying the operational head and mounted on the carriage so as to be movable relative thereto in a straight line perpendicular to the direction of movement of the carriage, c. Control means responsive to information signals to control the movement of the carriage, slide and operational head, and d. transport means operable to move the carriage relative to the fixed bed and the slide relative to the carriage in response to the information signals, wherein the transport means comprises a main toothed rack attached to one of each pair of relatively movable bodies and at least three actuators attached to the other of each pair of bodies, each actuator being operable to force into engagement with the associated main toothed rack a stub toothed rack of the same tooth pitch as the main rack, the stub racks being spaced from one another along the associated main rack by a distance differing from an integral number of rach tooth pitches by a like fraction of a pitch equal to the reciprocal of the number of actuators.

The invention will now be described with reference to the accompanying drawings, in which.

Figure 1A:
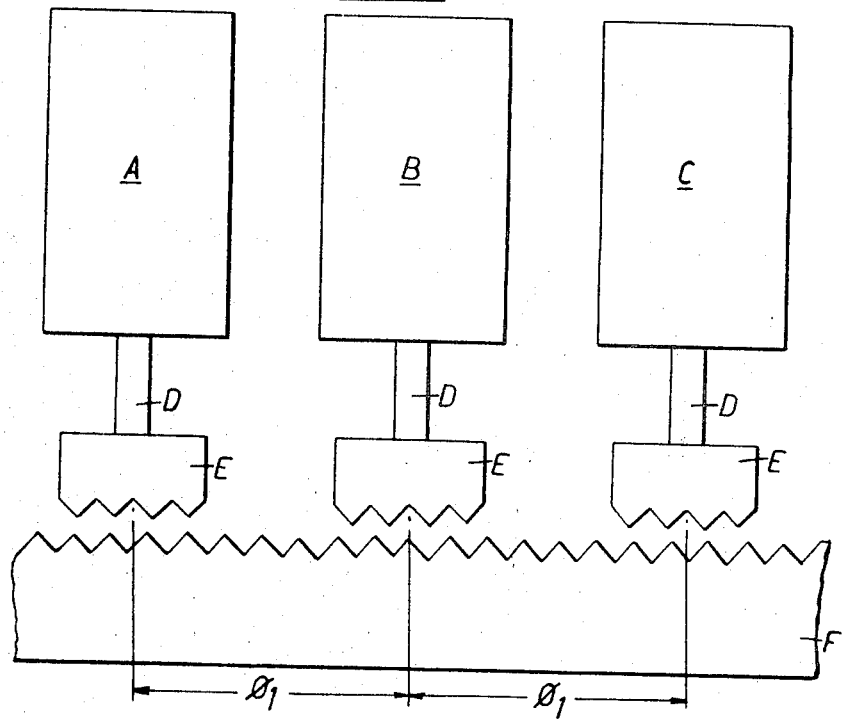
FIG. 1A and 1B show a simplified form of the invention.
Figure 1B:
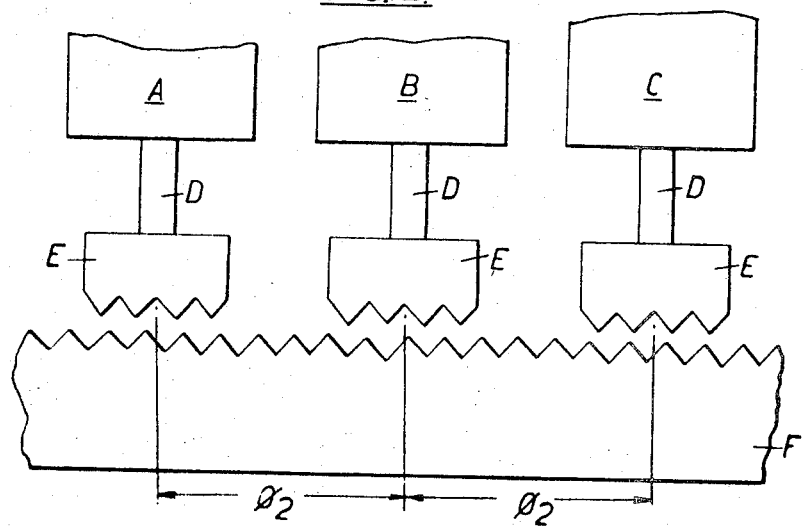

Referring now to FIGS. 1A and 1B, these show three actuators, A, B and C which are fastened to one of the two bodies. Each actuator is operable to move a plunger D which carries at its extremity a stub toothed rack E. The three stub racks are of the same form and pitch as one another, and as a long main rack F which is fastened to the other of the two bodies.

The spacing $\phi$ between the actuators is such that the plungers are separated by a distance equal to an integral number of rack tooth pitches plug or minus a fraction of a pitch equal to the reciprocal of the number of actuators. In the case shown in FIG. 1A there are three actuators, and the offset $\phi$ between plungers is shown as seven plug one-third rack tooth pitches. Operation of actuator B will havee no effect, but operation of actuator A will cause the rack F to move to the left by one-third of a rack tooth pitch, and operation of the actuator C will cause the rack to move to the right by one-third of a rack tooth pitch. Continuous movement of rack F to the left is thus produced by operating the actuators sequentially in the order ACBACB, and continuous movement of the rack F to the right in produced by operating the actuators in the order CABCAB.

In FIG. 1B, the spacing $\phi_2$ of thee plungers is seven minus on third rack tooth pitches. The direction of movement of the rack F for any sequence of operation of the actuators is the reverse of that given above. Movement will still be in steps of one-third of a rack tooth pitch. Hence continuous movement of rack F to the left is produced by operation of the actuators in the sequence CABCAB, whilst movement of rack F to the right is produced by operation of the actuators in the sequence ACBACB.

If more than three actuators are used, then the fraction of a rack tooth pitch included in the offset between plungers, will, of course, no longer be one-third. This fraction is always the reciprocal of the number of actuators.

It must be noted that, as described above, the fraction of a pitch must always be added to the integral number of pitches, or must always be subtracted from the integral number of pitches, though the integral number itself need not be constant.

Nothing has yet been said about the type of actuator. The most likely forms are hydraulic, pneumatic or electromagnetic.

Figure 2:
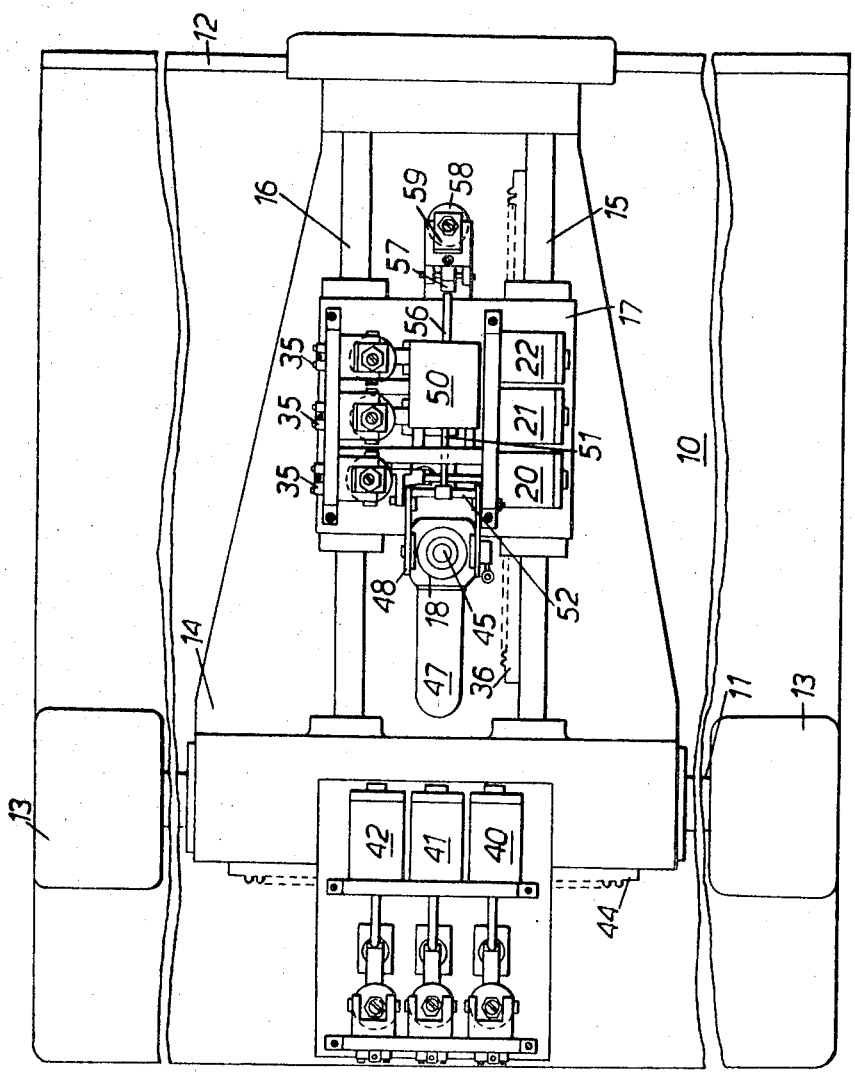
FIG. 2 is a plan view of a machine tool incorporating the invention.
Figure 3:
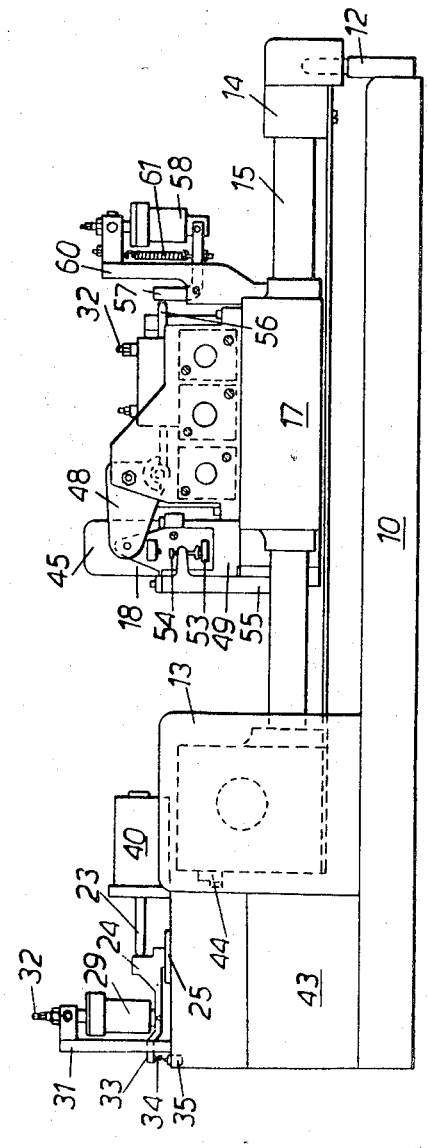
FIG. 3 is a side elevational view of the machine tool of FIG. 2.

Referring now to FIGS. 2 and 3, the machine tool includes a fixed bed 10 on which is fixed a pair of rails 11 and 12. The rail 11 is supported in blocks 13 fastened to the bed, and the rail 12 is fastened to one edge of the bed parallel to rail 11. Slidable on the rails 11 and 12 is a carriage 14 which supports a further pair of rails 15 and 16 arranged at right angles to the rails 11 and 12. The rails 15 and 16 carry a slide 17 on which is mounted a machining head 18 and also the means for moving the slide 17 relative to the carriage 14; hereafter referred to as "transport means."

Hereinafter the direction parallel to the rails 15 and 16 will be referred to as the Y direction and the direction parallel to the rails 11 and 12 will be referred to as the X direction.

The transport means for moving the carriage 14 relative to the fixed bed 10 are mounted on the bed. Since the two transport means are substantially identical, the same reference numerals will be used to refer to both, where applicable.

Figure 4:
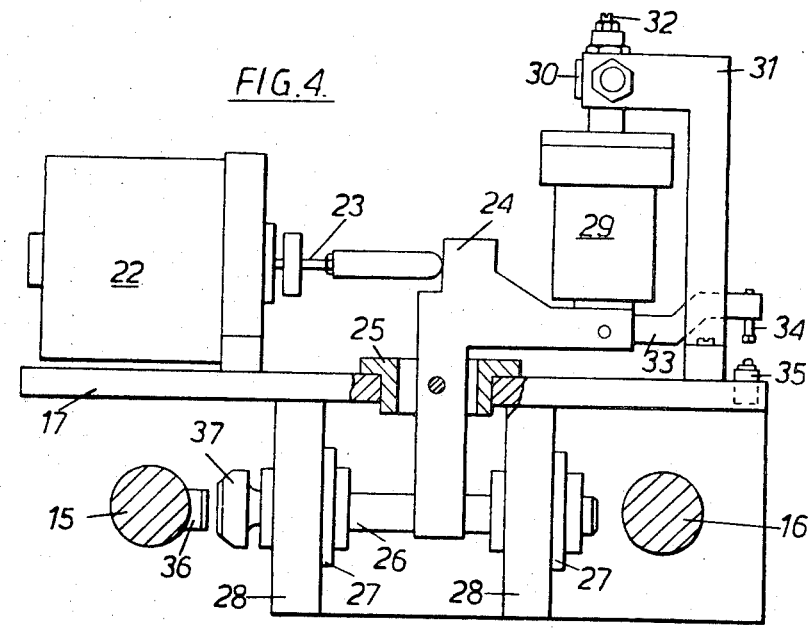
FIG. 4 is an enlarged end elevational view of part of the machine tool.
Figure 5:
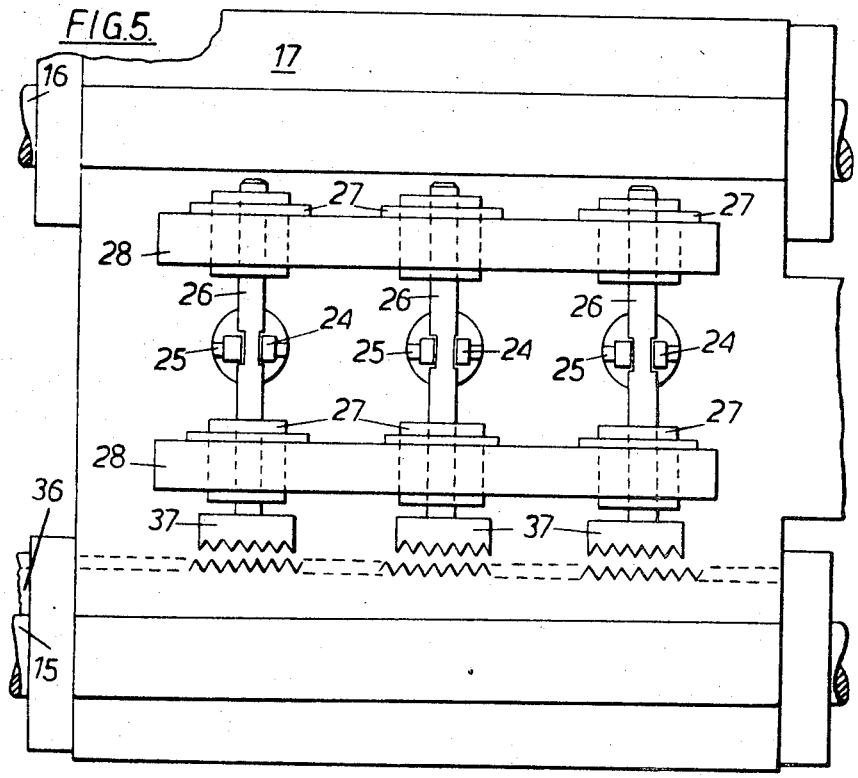
FIG. 5 is an underside view of the part of the machine tool shown in FIG. 4.

FIGS. 4 and 5 show more detail of the transport means attached to the slide, and hence this will be described in detail with reference to FIGS. 2 to 5.

Three electromagnets 20, 21 and 22, hereafter referred to as the Y electromagnets, are carried on the slide, each having a straight armature 23 movable in the X direction. The end of each armature remote from the associated electromagnet abuts against a pivoted bell-crank lever 24. The lever is pivoted in a bush 25 passing through the body of the slide 17, and extends below it. The lower end of the bell-crank is forked and fits astride a narrowed portion of a horizontal push rod 26, movable in the X direction and supported in ball-bearings 27 located in two webs 28 under the slide. The push rods 26 are located in line with the centre of the rail 15 on which the slide is carried.

The remote end of each bell-crank lever 24 is pivotally attached to the cylinder of a dash-pot 29, the piston of which is attached to a trunnion 30 carried on a supporting member 31. A needle valve is carried on the dash-pot piston and is adjustable by means of a screwed extension 32. An extension 33 of the bell-crank lver 24 beyond the dash-pot carries an adjusting screw 34 and is arranged so as to actuate a microswitch 35 when the mechanism is in one of its two extreme positions.

Each electromagnet operates a mechanism identical to that described in FIG. 1 above, the three push rods 26 being parallel to one another and at right angles to the rail 15. One the rail 15 is carried a toothed main rack 36, projecting towards the push-rods 26. Each push rod carries a stub toothed rack 37 of the same pitch and form as the main rack 36. The spacing between the push-rods 26 is equal to an integral number of rack tooth pitches plus (or minus) a fraction of a pitch equal to the reciprocal of the number of electromagnets as described above. Hence the stub racks 37 are offset from one another by one third of a rack tooth pitch.

The transport means for moving the carriag 14 in the X direction is identical to the means described above. The only differences are in the location of the parts of the mechanism. For example the electromagnets 40, 41 and 42, hereafter referred to as the X electromagnets, together with the associated bell-crank levers, dash-pots, push-rods and the like are all mounted on a supporting block 43 fastened to the bed 10 of the machine. The corresponding main rack 44 is carried on the carriage as shown in FIG. 2. The X electromagnets will be required to be more powerful than the Y electromagnets such the carriage 14 will be heavier than the slide 17.

The remaining part of the mechanism is that controlling the machining head. This comprises an electric motor 45 carried on the slide and operating a drill bit or milling cutter (not visible) which projects through a slot 47 in the base of the carriage 14. The motor 45 is carried in eccentric trunnions 48 and is constrained by a guide 49 so that is only able to move vertically, that is in the Z direction. Movement of the motor is controlled by an electromagnet 50, the Z electromagnet, the armature 51 of which acts on a tie bar 52 connecting one end of each eccentric trunnion 48. Carried on the motor housing are two microswitches 53 which cooperate with an adjustable stud 54 carried on a rod 55 fastened to the slide. An extension 56 of the electromagnet armature away from the motor 45 co-operates with one end of a pivoted cranked lever 57 attached at the other end to the cylinder of a dashpot 58. The dashpot piston is supported in a trunnion 59 pivotally carried on a supporting member 60.

In order to reduce frictional forces the slide 17 and carriage 14 will be carried on the rails 15, 16 and 11, 12 respectively by ball-bearing bushes.

The emergisation of a single electromagnet, say 22, results in the armature 23 causing the bell-crank lever 24 to pivot about the pivot pin in bush 25. The lower forked end of the lver 24 moves the push-rod 26 so that the stud rack 37 is moved towards the main rack 36. As shown in FIG. 5, the stub rack 37 operated by electromagnet 22 is offset from the position of the main rack by one third of a rack tooth pitch. Hence as the stub rack is forced into engagement with the main rack, the sldie will move along the rails 15 and 16 to bring the two racks into alignment. If, therefore, it is required to move the slide sideways, it is necessary to energise the three Y electromagnets sequentially in the correct order. For example, to move the slide to the right as shown in FIG. 2, the Y electromagnets must be energised in the order 20, 21, 22, 20, 21 .... It is necessary for each electromagnet to be de-energised before the next one is energised. To lock the slide in a particular position it is only necessary to maintain the energisation of the electromagnet which causes the final movement to that position.

Movement of the carriage is brought about by operating the X electromagnets in a similar manner.

The dashpots connected to the transport means are provided to prevent too abrupt movement of the mechanism. The speed of movement may be controlled by altering the delay provided by the dashpots. This is done by adjustment of the needle valve 32 of each dashpot.

As well as operating the dashpots, the bell-crank levers 24 also control microswitches 35. The transport means are controlled in known matter by signals from a punched tape driven through a tape reader by a stepping motor, as disclosed in U.S. Pat. No. 3,163,057, dated Dec. 29, 1964. The microswitches 35 also control the stepping motor in known manner so that the tape cannot be advanced until the previous signal has been acted on. This is necessary on account of the complexity of the transport means and the fact that the carriage and slide will move at different speeds.

The operation of the machining head is straightforward. When the electromagnet 50 is energised the operational head is lowered, one of the microswitches 53 indicating when this has occurred. De-energisation of the electromagnet 50 raises the machining head and operates the other one of the two microswitches 53.

Movement in the X and Y directions may take place simultaneously, but the carriage and slide must be locked in position when the operational head is moving.

The positioning accuracy of the machine is dependent only on the pitch of the two main racks 36 and 44. The workpiece to be operated upon will be clamped to the bed of the machine by clamping means (not shown).

Nothing has been said about the method of coding the required signals on to the punched tape since this is well-known to those skilled in the art. Control means other than punched tape may be used, for example, magnetic tape.

What we claim is:

1. Means for accurately positioning an operational head in any of a series of positions with respect to a member, the positions being defined by the intersections of the rows and columns of a rectangular grid, including
   a) a fixed bed on which is located thee member and which carries a carriage movable in a straight line relative to the member,
   b) a slide carrying the operational head and mounted on the carriage so as to be movable relative thereto in a straight line perpendicular to the direction of movement of the carriage,
   c) control means responsive to information signals to control the movement of the carriage, slide and operational head, and
   d) transport means operable to move the carriage relative to the fixed bed and the slide relative to the carriage in response to the information signals, the carriage and the bed forming one pair of relatively movable bodies and the slide and the carriage forming another pair of relatively movable bodies, said transport means comprising a main toothed rack attached to one of each pair of relatively movable bodies and at least three actuators attached to the other of each pair of bodies, each actuator being operable to force into engagement with the associated main toothed rack a stub toothed rack of the same tooth pitch as the main rack, the stub racks being spaced from one another along the associated main rack by a distance differing from an integral number of rack tooth pitches by a like fraction of a pitch equal to the reciprocal of the number of actuators.

2. Means as claimed in claim 1 in which the stub racks of the transport means are spaced from one another along the associated main rack by a distance equal to an integral number of rack tooth pitches plus a fraction of a pitch equal to the reciprocal of the number of actuators.

3. Means as claimed in claim 1 in which the stub racks of the transport means are spaced from one another along the associated main rack by a distance equal to an integral number of rack tooth pitches minus a fraction of a pitch equal to the reciprocal of the number of actuators.

4. Means as claimed in claim 1 in which the transport means includes three actuators associated with each main rack.

5. Means as claimed in claim 1 in which the actuators of the transport means are electromagnets.

6. Means as claimed in claim 1 in which the control means is responsive to recorded data representing the movements of the carriage, slide and operational head.

7. Means as claimed in claim 6 in which the recorded data is in the form of a punched paper tape.

8. Means as claimed in claim 6 in which the recorded data is in the form of a magnetic tape.

* * * * *